Oct. 11, 1938.  H. J. LE VESCONTE  2,133,228
POWER TRANSMITTER
Filed June 29, 1935  2 Sheets-Sheet 1
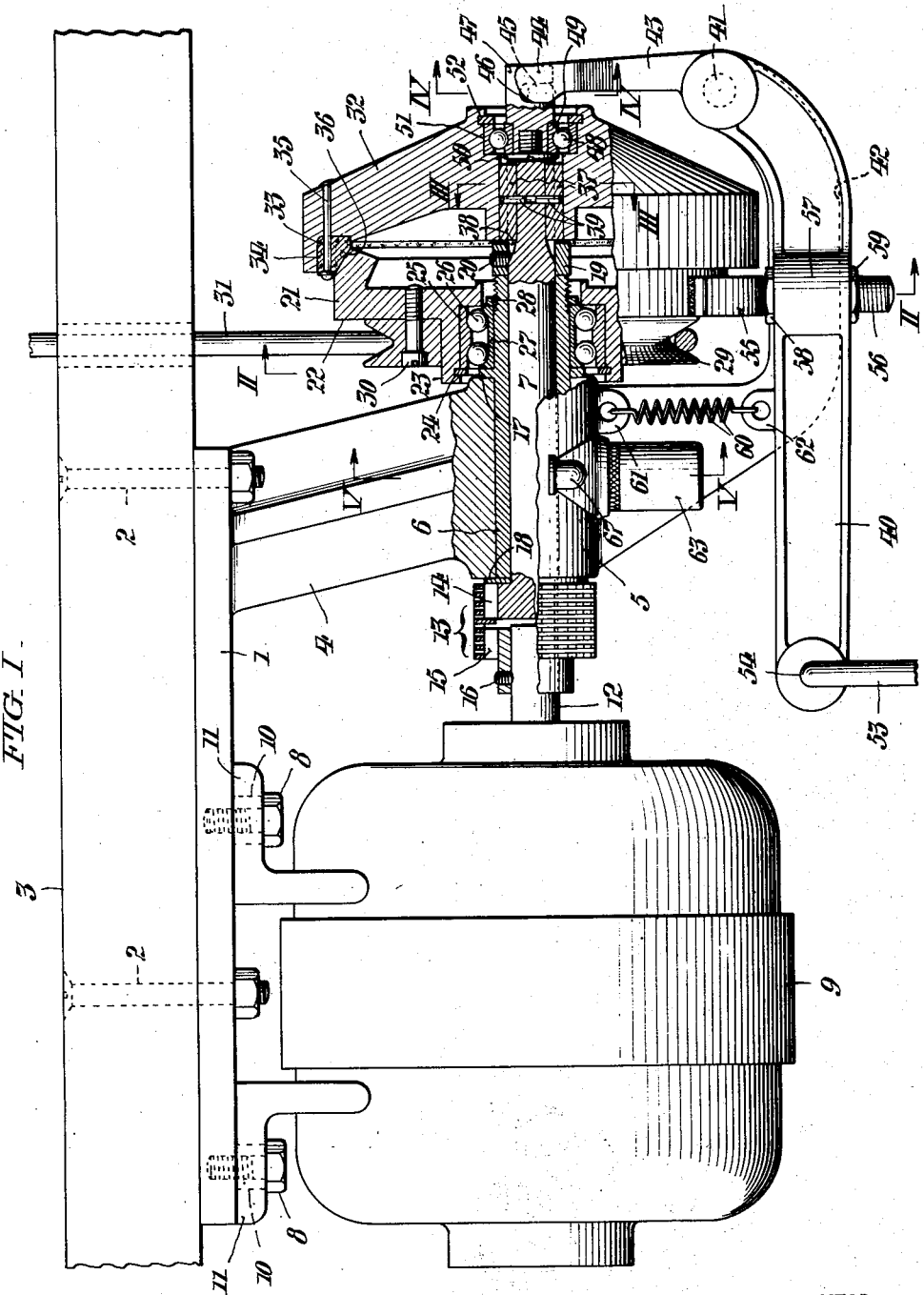
FIG. I.
WITNESSES:
INVENTOR:
Harold J. Le Vesconte,
BY
ATTORNEYS.

Oct. 11, 1938.  H. J. LE VESCONTE  2,133,228
POWER TRANSMITTER
Filed June 29, 1935  2 Sheets-Sheet 2
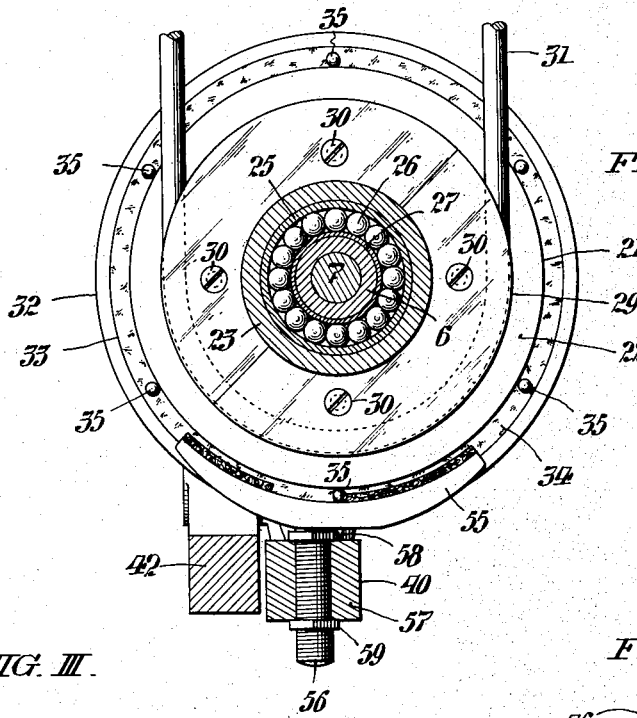
FIG. II.
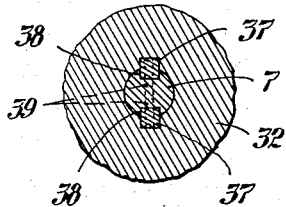
FIG. III.
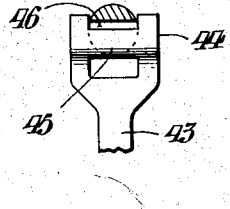
FIG. IV.
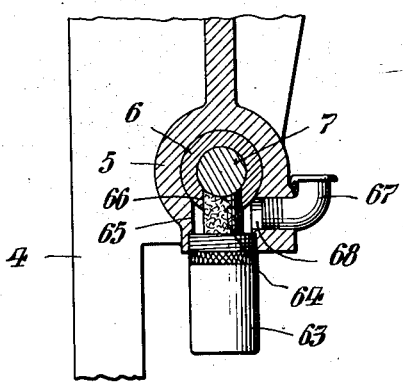
FIG. V.
WITNESSES:
John C. Bergner
Andrew Stermern
INVENTOR:
Harold J. LeVesconte,
BY Fraley Paul
ATTORNEYS.

Patented Oct. 11, 1938

2,133,228

UNITED STATES PATENT OFFICE 2,133,228

POWER TRANSMITTER

Harold J. Le Vesconte, Western Springs, Ill., assignor to Union Special Machine Company, Chicago, Ill., a corporation of Illinois Application June 29, 1935, Serial No. 29,013

7 Claims. (Cl. 192—17)

This invention relates to power transmitters, particularly to power transmitters for driving sewing machines and the like.

In power transmitters of the kind specifically referred to, a driving clutch member is shiftable by manual control means, into and out of engagement with a driven clutch member on a transmission shaft receiving power from an electric or other motor.

My invention is directed toward structurally simplifying and refining such transmitters with a view toward rendering them more compact; facilitating the manufacture and assembling of the component parts; and providing for better control and operation of the interengaging clutch members from the standpoint of obviating sticking of the clutch members, insuring firm grippage between them the instant they are brought into engagement, and preventing overrunning of the driven clutch member so that the machine or apparatus receiving power from the transmitter is stopped practically instantaneously upon disconnection of said clutch members.

Another object of my invention is to provide for positional adjustment of the motor so that its shaft may be easily and quickly aligned and coupled with the transmission shaft.

Another object of my invention is to afford in connection with a power transmitter having the above attributes, a simple and efficient means for automatically supplying lubricant to the transmission shaft.

Other objects and attendant advantages of this invention will appear from the detailed description which follows of the attached drawings, wherein Fig. I is a view partly in side elevation and partly in longitudinal section of a power transmitter conveniently embodying the present improvements.

Fig. II is a cross section taken as indicated by the arrows II—II in Fig. I.

Figs. III, IV and V are fragmentary detail sectional views taken as indicated respectively by the arrows III—III, IV—IV and V—V in Fig. I.

As herein illustrated, my improved power transmitter comprises an attaching plate 1 which is secured by means of screw bolts 2 to the underside of a table 3 for supporting a sewing or other machine or apparatus which is to be driven from the transmitter. Projecting downward at an angle from the attaching plate 1 is an integrally formed, pendant bracket arm 4, which, about midway of its length, affords a horizontal bearing boss 5. Forced into the boss 5 of the bracket 4 is a bearing sleeve 6 wherein is journaled a transmission shaft 7. Secured to the attaching plate 1 at one side of the bearing boss 5 by means of bolts 8 is an electric motor 9, said bolts 8, it will be noted, passing through slots 10 in the flanged feet 11 of the motor so that the latter can be positionally adjusted relative to the bracket arm 4 and aligned with the transmission shaft 7. The shaft 12 of the motor 9 is connected to the transmission shaft 7 by a flexible coupling 13 having the form of a chain with its links engaging the teeth of an integrally-formed sprocket pinion 14 on said transmission shaft 7, as well as with the teeth of a similar sprocket pinion 15 affixed to the motor shaft by a set screw 16. As shown in Fig. I, the bushing 6 extends beyond the bearing 5 at the right, and has a circumferential flange 17 abutting the corresponding end of said bearing. The transmission shaft 7 is prevented from shifting jointly by a thrust washer 18 interposed between the sprocket pinion 14 and the contiguous end of the bushing 6, and a thrust collar 19 which is secured by a set screw 20 to said shaft and contacts with the opposite end of the bushing.

Free to revolve about the projecting end of the bushing 6 is a driven clutch member 21 with a flat side 22 from which an axial hub 23 extends. Lodged within the hollow of the hub 23 and retained therein by a split keeper ring 24, is the outer ring 25 of a ball bearing 26. The inner ring 27 of the ball bearing 26 surrounds the projecting end of the bearing sleeve 6 and is held against displacement between the circumferential flange 17 and a jamb nut 28 engaging threads on said sleeve. Centered on the hub 23 of the driven clutch member 21 is a diametrically split wheel 29 whereof the halves are secured to the flat face 22 of said clutch member by means of screws 30. In the illustrated instance, the wheel 29 has the form of a sheave adapted to be coordinated by a belt 31 with the pulley of a sewing or other machine (not shown) supported on the top of the table 3. The described arrangement obviously permits substitution of wheels 29 of different sizes for transmission of power at correspondingly different speeds. The driven clutch member 21 and the attached wheel 29 are preferably constructed from aluminum or the like so as to have small momentum when rotated at high speeds.

Mounted on the right hand end of the transmission shaft 7 beyond the driven clutch member 21 is a driving clutch member 32 which is more amply proportioned and preferably constructed from iron or steel for capacity to operate after the manner of a fly wheel. As shown, the driving clutch member has an internal circumferential groove 33 of angular cross section for the seating of a lining 34 of cork or the like which is secured by rivets 35, and which is adapted to coact with the conical surface 36 of the driven clutch member in imparting motion to the latter. The driving clutch member 32 has a spline connection with the transmission shaft 7, said connection including keys 37 lodged in diametrically opposite key-ways 38 (Figs. I and III) in the shaft 7 and engaging corresponding key-ways in said clutch member. Pins 39 fixed in the keys and engaging a diametral hole in the shaft prevent the keys 37 from shifting in the key slots 38.

As a means for controlling the transmitter I have provided a lever 40 which is fulcrumed at 41 to a horizontal extension 42 of the bracket 4. As shown in Figs. I and IV, the lever has an upward arm 43 with a terminal clevis 44 whereof the cross web 45 engages a lateral notch 46 in a stud connected by a ball bearing 48 axially with the driving clutch member 32. The inner ring 49 of the ball bearing surrounds a reduced shouldered portion of the stud 47 and is secured by means of a screw 50 axially engaging said stud; while the outer ring 51 of said ball bearing is lodged in an axial recess at the outer end of the driving clutch member and held in place by a split retainer ring 52. The lever 40 is adapted to be actuated by means of a foot treadle not shown, through a vertical connecting rod 53 which at the upper end engages an aperture 54 in the end of said lever. Supported by the horizontal portion of the lever 40 is a lined brake shoe 55 having a threaded stem 56 extending through a boss 57 of said lever and adjustably secured by means of clamp nuts 58, 59 respectively engaging the top and bottom of the boss. The brake shoe 55 is adapted to coact as hereinafter explained with the periphery of the driven clutch member 21. A helical spring 60 engaged at one end with an ear 61 on the bearing 5 and at the other with an ear 62 on the lever 40 serves to normally keep the latter elevated with the brake shoe 55 engaging the driven clutch member and with the driving clutch member 32 out of engagement with said driven clutch member. Thus, by depression of the lever against the action of the spring 60 the brake shoe 55 is retracted from the driven clutch member 21 and the driving clutch member 32 shifted axially of the shaft 7 into engagement with said driven clutch member to drive the sewing or other machine by means of the belt 31. When pressure on the lever 40 is released, the spring 60 immediately acts to effect disconnection of the driving clutch member 32 from the driven clutch member 21 and the concurrent application of the brake shoe 55 to the driven clutch member so that the latter is immediately stopped.

For the purpose of lubricating the transmission shaft 7 I have provided means as follows: screwed into the bottom of the bearing boss 5 (Figs. I and V) of the bracket 4 is a reservoir 63 for lubricating oil, said reservoir having a wick 64 which reaches upwardly through registering apertures 65, 66 respectively in the boss 5 and the sleeve 6 to the shaft 7. Oil is introduced into the reservoir through an oil cup 67 which, as shown in Fig. V is attached to the side of the boss 5 and which communicates with said reservoir through a lateral duct 68 in said boss. The location of the cup 67, it will be noted is such that when the oil is introduced, a portion of it will immediately reach the transmission shaft 7.

From the foregoing it will be seen that I have provided a very simple, manually-controlled electrically motivated power transmitter in the form of a compact unit constructed from parts which are easily fabricated and assembled. By virtue of the heaviness and resultant high momentum of the driving clutch member 32, power is instantly applied to the actuated machine or apparatus when said clutch member is brought into engagement with the driven clutch member 21. On the other hand, immediately upon disconnection of the driving clutch member 32, the light driven clutch member 21 and the actuated machine or apparatus is stopped almost instantaneously when the brake shoe 55 is brought into engagement with said driven clutch member under the action of the spring 60 regardless of speed.

It is to be particularly noted that in the transmitter of my invention, the disconnection of the clutching members 21 and 32 is positive through multiplication of the power of the spring 60 by the lever 40 as compared with the usual arrangement wherein a direct-acting spring is relied upon to effect the disengagement. Accordingly, clutching faces of a lesser angle can be employed as shown. A further advantage resulting from my improved construction is that less effort is required on the part of the operator to bring the clutch members into clutching engagement, since the usual heavy spring pressure heretofore necessary to be overcome, is dispensed with.

Having thus described my invention, I claim:

1. A power transmitter comprising an attaching plate with an integral projecting bracket arm affording a bearing for a transmission shaft; a motor secured to the attaching plate with capacity for positional adjustment relative to the bracket, and having its shaft coupled with the transmission shaft; a driven clutch member free on said transmission shaft bearing; a driving clutch member having a spline connection with the transmission shaft; and control means for shifting the driving clutch member into and out of engagement with the driven clutch member.

2. A power transmitter comprising a bracket with a bearing boss; a bearing sleeve for a transmission shaft fixed within the boss; a motor position at one side of the bearing boss; a flexible coupling connecting the shaft of the motor to said transmission shaft; a driven clutch member free on and buttressed against end thrust by the bearing sleeve at the other side of the bearing boss; a driving clutch member having a splined connection with the transmission shaft beyond the driven clutch member; and control means for shifting the driving clutch member into and out of engagement with the driven clutch member.

3. A power transmitter unit comprising a bracket arm with a bearing for a transmission shaft; a driven clutch member with a belt wheel relatively free on and buttressed against end thrust by the transmission shaft bearing; a driving clutch member having a splined connection with said transmission shaft beyond the driven clutch member; and control means for shifting the driving clutch member into and out of engagement with the driven clutch member, said control means including a lever with a fulcrum on the bracket arm, and an axial stud connected by a ball bearing with the driving clutch member and having a lateral notch engaged by the lever.

4. A power transmitter unit comprising a bracket arm with a bearing for a transmission shaft; a driven clutch member with a belt wheel relatively free on and buttressed against end thrust by the transmission shaft bearing; a driving clutch member having a splined connection with said transmission shaft beyond the driven clutch member; and control means for shifting the driving clutch member into and out of engagement with the driven clutch member; said control means including a lever with a fulcrum on the bracket arm, and an axial stud connected by a bearing with the driving clutch member and having a lateral notch engaged by the cross web of a clevis on the lever.

5. A power transmitter unit comprising a bracket arm with a bearing for a transmission shaft; a driven clutch member with a belt wheel relatively free on and buttressed against end thrust by the transmission shaft bearing; a driving clutch member having a splined connection with said transmission shaft beyond the driven clutch member; and control means for shifting the driving clutch member into and out of engagement with the driven clutch member, said control means including a lever fulcrumed on the bracket arm and connected to the driving clutch member, a brake shoe on the lever, and a spring in tension between the lever and the bracket arm for normally maintaining the brake shoe engaged with the driven clutch member and the driving clutch member disengaged from the driven clutch member.

6. A power transmitter unit comprising a bracket arm with a bearing for a transmission shaft; a motor positioned at one side of the bearing; a flexible coupling connecting the shaft of the motor to said transmission shaft; a common support for the bearing and motor; a driven clutch member with a belt wheel rotatively free on and buttressing against end thrust by the transmission shaft bearing at the side opposite the motor; a driving clutch member having a splined connection with said transmission shaft beyond the driven clutch member; and control means for shifting the driving clutch member into and out of engagement with the driven clutch member.

7. A power transmitter unit comprising a bracket arm with a bearing for a transmission shaft; a driven clutch member with a belt wheel rotatively free on and buttressed against end thrust by the transmission shaft bearing; a driving clutch member having a splined connection with said transmission shaft beyond the driven clutch member; and control means for shifting the driving clutch member into and out of engagement with the driven clutch member, said control means including a lever fulcrumed on the bracket arm and connected to the driving clutch member, a brake shoe on the lever, and yielding means influential upon the lever to normally maintain the brake shoe engaged with the driven clutch member and the driving clutch member disengaged from said driven clutch member.

HAROLD J. LE VESCONTE.